United States Patent [19]
Valentin

[11] Patent Number: 5,423,986
[45] Date of Patent: Jun. 13, 1995

[54] APPARATUS FOR THE REMOVAL OF CLARIFIED WASTE WATER FROM CIRCULAR TANKS

[75] Inventor: Franz Valentin, Munich, Germany

[73] Assignee: Hans Huber GmbH & Co. KG, Berching, Germany

[21] Appl. No.: 150,089

[22] PCT Filed: Mar. 15, 1993

[86] PCT No.: PCT/EP93/00587
§ 371 Date: Nov. 15, 1993
§ 102(e) Date: Nov. 15, 1993

[87] PCT Pub. No.: WO93/21111
PCT Pub. Date: Oct. 28, 1993

[30] Foreign Application Priority Data
Apr. 9, 1992 [DE] Germany .................. 9204960 U

[51] Int. Cl.⁶ .............................................. B01D 21/24
[52] U.S. Cl. ................................... 210/519; 210/540
[58] Field of Search .............. 210/519, 528, 538, 540, 210/532.1, 248

[56] References Cited
U.S. PATENT DOCUMENTS

| | | | |
|---|---|---|---|
| 1,456,759 | 5/1923 | Booth | 210/170 |
| 2,502,490 | 4/1950 | Sweet | 210/528 |
| 3,447,688 | 6/1969 | MacCabe | 210/540 |
| 4,278,541 | 7/1981 | Eis et al. | 210/528 |
| 4,592,845 | 6/1986 | Lejeune et al. | 210/528 |
| 4,994,179 | 2/1991 | Keeter et al. | 210/540 |
| 5,154,835 | 10/1992 | DeMichael | 210/540 |
| 5,300,220 | 4/1994 | McEwen | 210/167 |

FOREIGN PATENT DOCUMENTS 4028148 3/1992 Germany .
229433 1/1944 Switzerland .

Primary Examiner—Christopher Upton
Attorney, Agent, or Firm—Dvorak and Traub

[57] ABSTRACT

The invention relates to an apparatus for the removal of clarified waste water from circular tanks which have a central waste-water inlet. It is notable for a submerged pipe which is constructed as a ring conduit provided concentrically with the vertical axis of the ring tank and is arranged underneath the surface of the clarified waste water in order to draw off the clarified waste water uniformly, the drainage of the latter being regulatable independently of the incoming amount by means of a control system and the water level in the tank being controllable in a constant manner by means of said system.

12 Claims, 3 Drawing Sheets

APPARATUS FOR THE REMOVAL OF CLARIFIED WASTE WATER FROM CIRCULAR TANKS

The invention relates to an apparatus for the removal of clear waste water from circular tanks having a central waste-water inlet.

Many clarification tanks have a circular gutter at the rim of the tank as drain. Under the hydraulic gradient, clear water flows over a straight or serrated dentated sill. The amount removed increases with the degree of flooding. The circular clarification tank functions optimally only if the source flow from the central structure is able to drain in a uniformly distributed manner in all directions.

On the one hand, said drain is unfavorably affected by algae growth in the region of the dentated sill. On the other hand, even small flows in the water surface, such as, for example wind, alter the symmetry. In the most unfavorable case, about half the gutter circumference remains unused (completely different wind conditions on the leeside compared with the weather side). This means that double the amount drains off via the remaining part, while the settling efficiency is reduced at the leeside. Floating sludge is entrained to a greater degree and the user is saddled with higher costs.

Further difficulties are to be perceived in the fact that the dentated sill installation requires expensive leveling for the abovementioned reasons. In addition, the water level cannot be controlled separately from the amount drained. A high drainage loading with solids is to be expected in addition to a high expenditure on cleaning the gutters.

In contrast, the object of the invention is to even out the amount drained and at the same time to increase it, and to render the water level in the circular tank independent of the take-off of the clarified waste water.

Surprisingly, this object is achieved by a completely filled submerged pipe which is arranged underneath the surface of the clarified waste water in order to draw off the clarified waste water uniformly, the drainage of the latter being regulable independently of the supply tank by means of a control system.

A uniform regulable amount is therefore drained from underneath the surface of the clarified waste water.

The drainage may be volume-controlled.

In general, the volume control is carried out by altering the difference in height between the water level in the tank and the water level in the drain.

Preferably, the submerged pipe is constructed as a ring conduit having perforations at an equal distance from one another.

It is beneficial if the ring conduit is connected by means of an efflux collecting conduit to a drainage duct arranged outside the circular tank.

Expediently, a drainage device is provided which is adjustable in height with respect to the drainage duct.

In general, the ring conduit will be arranged equidistantly from the central inlet.

If the pipe openings and pipe diameters are correctly dimensioned, a single drainage conduit through the tank wall may be sufficient. Said drainage conduit leads to an overflow sill which is regulated independently of the water level. The drainage device itself may be a regulating sill.

The volume control can be carried out by altering the difference in height between the water level in the tank and the water level in the drain.

As a result of the measure according to the invention, the water level in the tank can be varied.

The internal pipe pressure can be set high enough at the pipe circumference to guarantee, in addition, discharge under pressure at the pipe end. The drainage velocity at the outlet from the pipe conduit can be maximal, while its outlet [sic] diametrically opposite said outlet can be close to zero.

The flooding above the submerged pipe can be regulated independently of the amount discharged.

In a further development according to the invention, the circular tank may also be used as a buffer tank.

No pump is provided.

The difference in height is responsible for the gradient and also for the velocity. The regulation can be carried out automatically, if desired, by raising and lowering the drainage device.

The outlet having submerged pipes can preferably be operated together with an inlet having the so-called Coanda tulip (German Utility Model G 91 12 947.8 filed on 30 Jan. 1992).

The measure according to the invention increases operational safety, reduces the maintenance requirements and improves the separation of solids, just as it improves the degree of purification. The waste-water costs are reduced.

As a result of the arrangement of a submerged pipe at a distance below the hydraulic level, where stable conditions already prevail, the closed pipe protects the water removed from light and consequently prevents photosynthesis. The amount drained becomes independent of the flooding.

The advantages of the precise regulation and of the increased drainage are ensured by the operation of the collecting conduit as a filled pipe. The efflux collecting conduit leads centrally through the outer tank wall to the weir sill, where a separate regulation is carried out. An adaptation to the desired operating state is possible. Because of the closed pipe system, the amount drained can be set separately. The maximum amount drained can be calculated accurately regardless of the size of the openings. The support is carried out statically on brackets.

If necessary, a downflow baffle which is adjustable in height is arranged just next to the submerged pipe.

The pipeline constructed as a collecting conduit is acted on discontinuously.

In the event of high impoundment, the necessary nonuniformity of the inflow along the pipe is extremely small for equal pipe diameter.

For large discharge amounts, it is conceivable to adapt the pipe diameter in steps to the associated throughput.

In designing the installation, losses such as pipe friction, possibly impact losses, dynamic pressure head losses, acceleration losses as a consequence of the inflow perpendicular to the flow direction in the pipe should be taken into account. Existing plants can be rehabilitated by retrofitting the measure according to the invention.

Preferably, it is possible, to improve the uniformity of the take-off further, to grade the submerged pipe in steps of increasing diameters towards the discharge from the tank. The velocity is limited to a mean velocity of 0.3 m/sec. at the end of the pipeline and the diameters are on the whole reduced since it is no longer necessary to operate with a large diameter throughout. The transition may also be made gradually by virtually continuous increase in diameter.

According to another embodiment it is possible to arrange for the slots to become smaller toward the drain in order to achieve uniform flow and prevent the maximum velocity being exceeded.

A particularly favorable combination results from the widening of the pipe toward the drain with simultaneous reduction in the slot length. This has the further advantage that the velocity of 0.3 m/sec. is achieved in every section of the pipe, which would be the case only at the pipe end without the grading. Any precipitation of sludge flakes carried in owing to the tractive stresses then being lower is avoided.

As a result of the combination of varied slot length and graded pipe diameters, a further improvement in the uniformity of the inflow is achieved.

It is not denied that clarification tanks having pipes with circular openings are known, (SU-PS [sic] 13 67 998 A1), in which case water is taken off from a clarification tank in different depths by opening a closure device on the pipe concerned. A solution for the problem encountered here cannot be derived from this publication.

Furthermore, a discharge stopcock which is mechanically controlled by means of an underpressure for the discharge of a densely layered liquid from a container is known (CH-PS 79062). The stopcock has circular openings but further common features do not exist.

Finally an apparatus for the separation of a solid phase from a liquid is known (US-PS 30 17 998). The inlet to the settling tank is a distributor gutter having a rectangular cross section and circular base openings. For small and normal influxes the inflow takes place via the base openings, but for larger influxes it takes place via the weir at the rim of the gutter. This is not an apparatus for the uniform removal of clarified waste water from possibly very large circular tanks and it is not even a completely filled submerged pipe in which only a pressure difference between the internal pipe pressure and the external pipe pressure is sufficient.

Exemplary embodiments of the invention will now be explained in greater detail with reference to the accompanying drawings. In these drawings, FIG. 1 shows the embodiment of a submerged pipe inside a circular tank;

Figure 1:
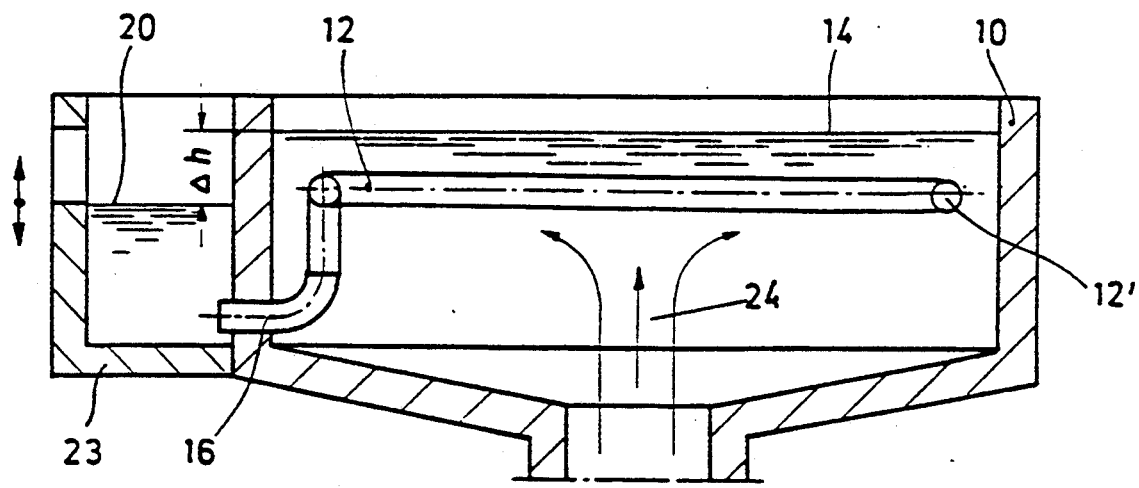
Figure 2:
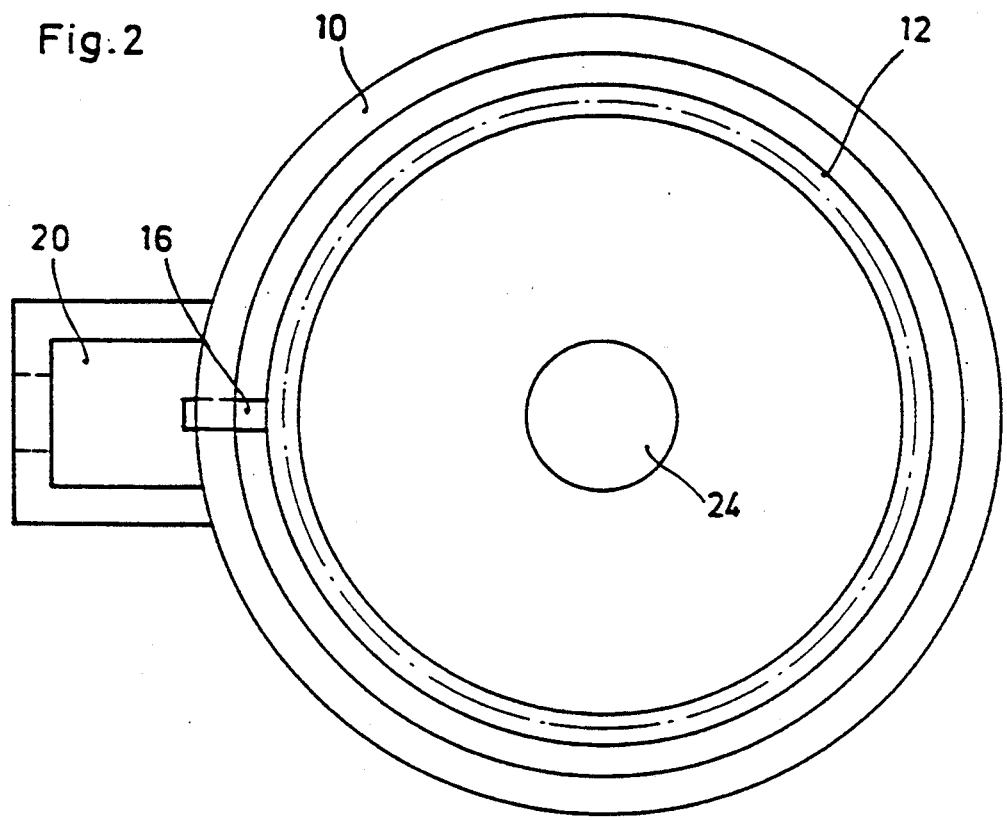
FIG. 2 is a plan view of FIG. 1.
Figure 3:
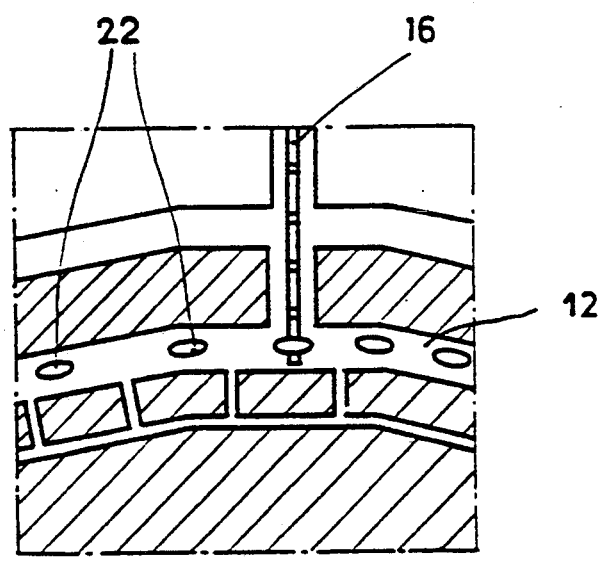
FIG. 3 shows a detail of a drain.

In a circular tank 10, which is generally made of concrete, a collecting conduit 12 is arranged equidistantly from the tank rim, and specifically in the submerged state at a distance below the hydraulic level 14. Situated at 24 is a defined inlet with control of the deflection, which is not set out here in greater detail. A central structure having a so-called Coanda tulip may be situated at this point. The water therefore flows in via the inlet 24. The clarified water is taken off in a defined manner via a ring conduit 12 which, as shown in FIG. 3, has slots 22 at an equal distance. Said slots may have minimum widths of 10 mm. From the efflux collecting conduit, the clarified waste water flows into the efflux conduit 16, and specifically, the water will have the maximum flow velocity in the region of the passage from the collecting conduit 12 into the efflux conduit 16 while at the oppositely situated end 12' it will have a velocity of virtually zero. After leaving the efflux conduit 16, the water enters a device having a regulating sill 23. Since said regulating sill can, as indicated by the double arrow, be raised and lowered, the inlet can be regulated independently of the drain and the liquid level in the circular tank independently of the outlet. Collecting conduit 12 and efflux conduit 16 are always completely filled. The water flows out of the regulating sill into a drainage duct which is not shown. It is also possible to automate the vertical adjustability of the regulating sill 23. The difference in height (in dynamic pressure head) is responsible for the gradient and the velocity at all times.

According to another embodiment it is also possible to route the efflux conduit 16 upwards and to allow the water to leave in a defined manner, for instance via a V-shaped cross section. In this case, the pipe itself would be constructed to be capable of being raised and lowered within certain limits, or a device associated with it would be.

In controlling the difference in dynamic pressure head between the hydraulic level 14 and the liquid level 20 in the regulating sill 23, pipe friction losses, losses due to viscous friction, acceleration losses when the liquid enters the various slots of the collecting conduit 12 and, possibly, losses due to turbulent flow should be taken into account.

A full pipe is always operated.

Since the flow through the submerged pipe is always under pressure, it is in fact irrelevant whether the inlet openings are arranged at the apex of the pipe, on the side wall, or in the base of the pipe.

As a result of the construction, mentioned above, of the inlet openings on the submerged pipe as slots of at least 10 mm width, it is possible, by altering the slot length, to bring about an adaptation to the hydraulic boundary conditions. The very precise flow cross section can therefore be produced very precisely in a specified manner by milling. This would be impossible with drills, which are, after all, made available for specified sizes.

According to the above, the submerged pipe itself is connected to the drainage duct via the drainage conduit. In the case of circular tanks having diameters of over 50 meters, in particular, a second ring conduit should possibly be provided nearer the center of the tank. The drainage conduit of this second ring conduit then also discharges into the drainage duct. As a modification of the measure described above it is possible, finally, to use the apparatus also for removal from rectangular tanks.

Figure 4:
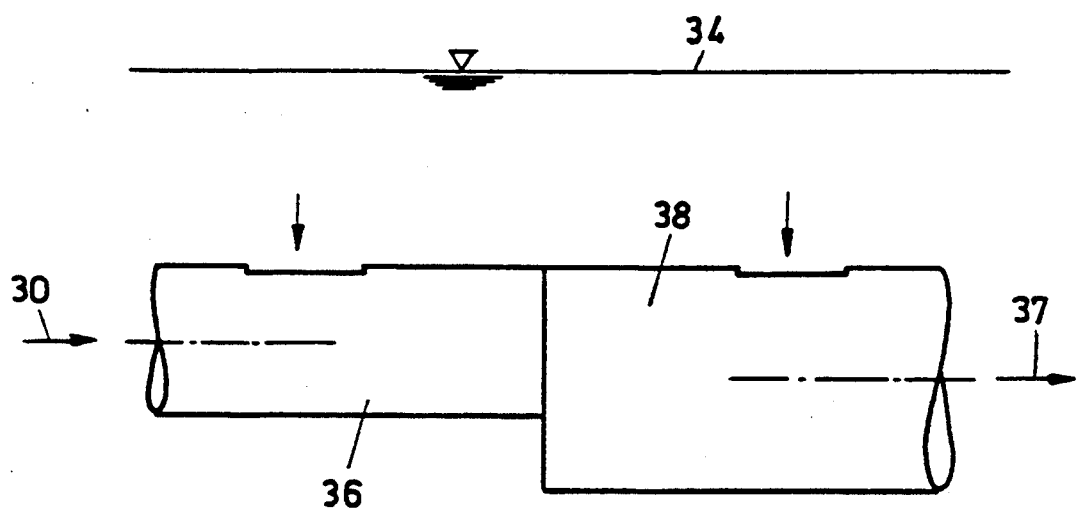
FIGS. 4 and 5 show a particular embodiment of the submerged pipe with the object of obtaining uniform, not unduly large flow velocities.
Figure 5:
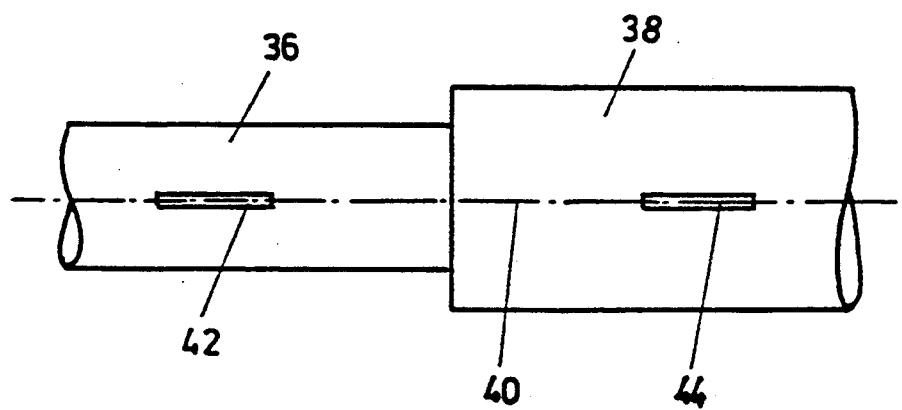

FIGS. 4 and 5 show a submerged pipe, in one case in side view (FIG. 4) and in the other in plan view (FIG. 5).

The submerged pipe is stepped toward increasing cross sections from the inflow side to the outflow side, the pipe extending in a flush manner at the top and a stepped manner at the bottom, as can be seen from FIGS. 4 and 5. Flow occurs from left 30 to right 32 and in this embodiment too, the submerged pipe is always arranged below water level 34. The cross sections are matched to the influx, that is to say a smaller cross section at 36 the greater cross section being at 38, where, after all, more water flows in. In the plan view it is seen that the pipe sections are arranged symmetrically with respect to one another in relation to the central axis 40. On the other hand, the slots 42, 44 become smaller in this embodiment toward the discharge, i.e. L1→L2. This evens out the flow. The result is achieved that, for example, a maximum flow velocity of 0.3 m/sec. can be maintained.

I claim:

1. an apparatus for the removal of water from a circular tank having a central waste water inlet, said apparatus being uniformly distributed around the circumference of the tank, having a submerged pipe which is arranged underneath the water surface and is provided with openings, wherein the submerged pipe is constructed as a closed ring conduit which is arranged concentrically with the vertical axis of the tank, connected to a drainage conduit and having inlet openings at an equal distance from one another in the form of slots having a decreasing area relative to conduit diameter as the slots approach the drainage conduit, forming means to equalize the flow in the conduit.

2. The apparatus as claimed in claim 1, wherein the drainage conduit comprises an efflux collecting conduit in communication with a drainage duct arranged outside the circular tank.

3. The apparatus as claimed in claim 2, wherein the ring conduit is arranged equidistantly from the central inlet and equidistantly from the internal circumference of the tank.

4. The apparatus as claimed in claim 2, wherein only a single efflux collecting conduit is provided.

5. The apparatus as claimed in claim 2, wherein the efflux collecting conduit is routed through the tank wall.

6. The apparatus as claimed in claim 1, further comprising means such that the liquid level above the submerged pipe can be regulated independently of the amount drained.

7. The apparatus s claimed in claim 6 wherein said liquid level regulating means comprises adjustable a regulating sill communicating with said drainage conduit.

8. The apparatus as claimed in claim 1, wherein, a second ring conduit is provided nearer the center of the tank, having a second drainage conduit communicating with the drainage duct.

9. The apparatus as claimed in claim 1, wherein the submerged pipe has a cross section which increases toward the outlet, starting from the point situated opposite the drainage conduit.

10. The apparatus as claimed in claim 9, wherein the submerged pipe comprises pipe segments graded in size and constructed so as to be flush at the top and stepped at the bottom.

11. The apparatus as claimed in claim 1, wherein the submerged pipe is designed for a maximum outlet velocity of 0.3 m/sec. and for exactly the same in every section of the pipe by a combination of slots which become smaller toward the outlet conduit and a pipe diameter which widens toward the outlet conduit forming means to improve the uniformity of the inflow of the submerged pipe.

12. The apparatus as claimed in claim 1, wherein the area of the slots decreases toward the drainage conduit.

* * * * *